United States Patent [19]

Navarro

[11] Patent Number: 4,588,336
[45] Date of Patent: May 13, 1986

[54] RACK AND PINION GEAR AND PROCESS OF FABRICATION

[76] Inventor: Bernard J. Navarro, 4212 Chevy Chase Dr., Glendale, Calif. 90039

[21] Appl. No.: 724,797

[22] Filed: Apr. 19, 1985

Related U.S. Application Data

[63] Continuation of Ser. No. 472,353, Mar. 4, 1983, abandoned.

[51] Int. Cl.$^4$ ............................................. B23F 1/06
[52] U.S. Cl. ........................................ 409/12; 407/23; 409/11; 409/48
[58] Field of Search ......................... 409/1, 58–60, 409/42–46, 9, 10, 47, 49, 12; 74/422–431, 432, 433, 434, 452

[56] References Cited

U.S. PATENT DOCUMENTS

| | | | |
|---|---|---|---|
| 583,065 | 5/1897 | Mathein | 409/10 |
| 717,167 | 12/1902 | Cheney | 409/48 X |
| 1,037,571 | 9/1912 | Zimmermann | 409/12 |
| 1,543,031 | 6/1925 | Short | 409/10 |
| 1,846,640 | 2/1932 | Head | 407/23 |
| 1,882,008 | 10/1932 | Head | 407/23 |
| 1,905,278 | 4/1933 | Edgar | 409/12 |
| 1,905,311 | 4/1933 | Sinderson | 409/48 X |
| 2,164,643 | 7/1939 | Drader | 409/12 |
| 2,201,670 | 5/1940 | Kraus | 74/422 |
| 2,212,737 | 8/1940 | Hart | 99/383 |
| 2,338,366 | 1/1944 | Trbojevich | 407/23 |
| 2,338,367 | 1/1944 | Trbojevich | 74/458 |
| 3,089,392 | 5/1963 | Romi | 409/48 X |
| 3,230,830 | 1/1966 | Romi | 409/48 X |
| 3,237,475 | 3/1966 | Mattson | 74/457 |
| 3,327,548 | 6/1967 | Welch | 74/410 |
| 3,371,396 | 3/1968 | Johnson | 407/27 |
| 3,371,552 | 3/1968 | Soper | 74/462 |

FOREIGN PATENT DOCUMENTS 2100158  12/1982  United Kingdom ................. 409/10

*Primary Examiner*—Gil Weidenfeld
*Assistant Examiner*—Glenn L. Webb
*Attorney, Agent, or Firm*—Warren T. Jessup

[57] ABSTRACT

A rack and pinion gear having helical teeth. A conical hob is employed for cutting recessed rack teeth in the work piece by continuously engaging the hob and work piece as the work piece moves longitudinally beneath (or with respect to) the rotating hob. To mate with the helical teeth in the rack, a helical gear having rounded or arcuate teeth is provided.

5 Claims, 9 Drawing Figures

RACK AND PINION GEAR AND PROCESS OF FABRICATION

This application is a continuation, of application Ser. No. 472,353, filed 03/04/83.

BACKGROUND OF THE INVENTION

It is known in the art to make a rack with recessed teeth having arcuate roots which mate with a pinion gear having arcuate teeth. To the best of applicant's knowledge, such rack and pinion gear arrangement has never been made with helical teeth. Helical teeth have an advantage that tooth engagement as the gear rotates is modulated over the length of the tooth, obviating the shock of engagement experienced by non-helical teeth. Also, in the prior fabrication of such a rack, the practice has been to: bring a disk cutter, or a set of cutters, into engagement with the work piece; cut a tooth or group of teeth by steadily lowering the cutter against the work piece; separate the cutter and work piece; move the work piece longitudinally; and then cut another groove or tooth. This is a slow process, and precise uniformity of tooth width depends on the skill of the machinist. Also, it could not be used to cut helical rack teeth. While the cutter could be skewed slightly, and the grooves/teeth might appear to be helical, they would in face be merely arcuate teeth skewed with respect to a perpendicular, and would not mate with a helical pinion gear. The present invention teaches a process and tooling for continuously cutting such recessed helical rack teeth.

Cylindrical hobs have been used to cut gear teeth. The gear blank is engaged by the hob and rotated in synchronism therewith. However, this cannot be done to make a rack, because of the straight configuration of the rack work piece.

SUMMARY OF THE INVENTION

In accordance with the present invention, a conical hob is provided with cutting teeth aligned on one or more helices surrounding the cone. The hob is rotated, and the elongate work piece which is to become the rack is moved longitudinally parallel to the axis of the hob. The smaller end of the hob is first engaged by the work piece, starting the cut of a groove and forming a rack tooth. As the work piece continues to move longitudinally, the larger end of the hob progressively engages a given groove, until finally the groove emerges from under the hob, with the groove having its final depth corresponding to the larger diameter of the conical hob.

When the axis of the rack parallels the axis of the hob, the teeth in the rack come out helical, with a helix angle the same as that of the hob. The rack then mates with a helical pinion gear of the same helix angle as that of the rack. Since fabrication of the rack produces teeth whose roots are arcuately recessed, rather than extending all the way transversely across the face of the rack, the teeth of the mating helical gear are also arcuate.

FIGURES

THE PREFERRED EMBODIMENT

Figure 1:
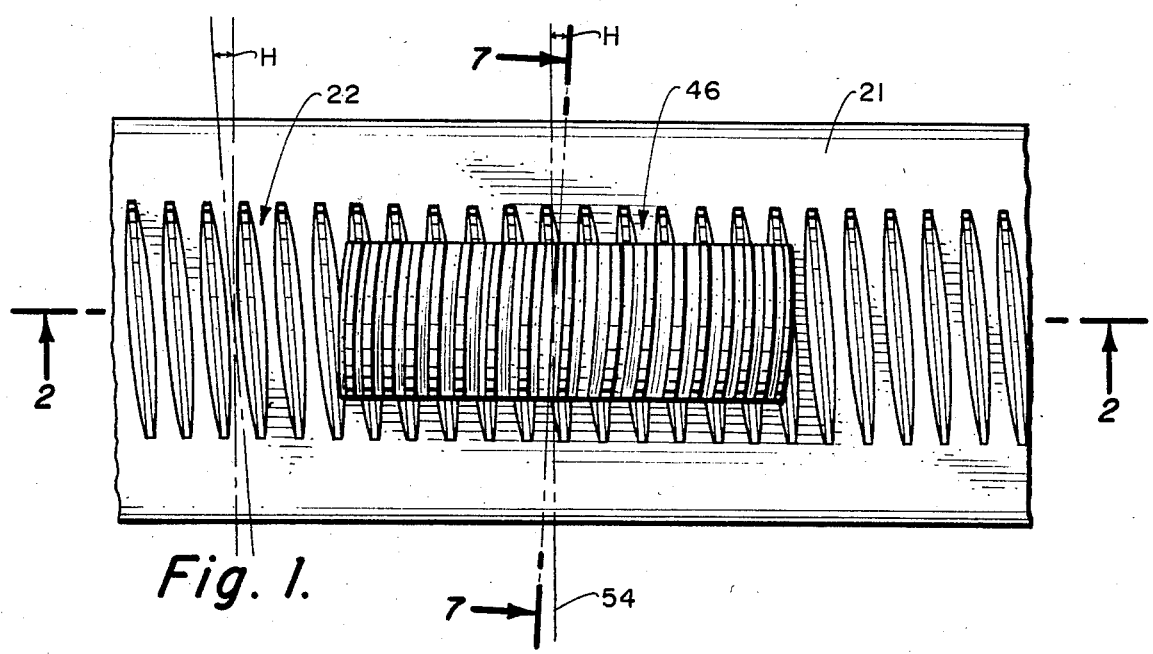
FIG. 1 is a top view of a rack made in accordance with the present invention and having helical teeth. A helical gear is shown in engagement with the rack.
Figure 2:
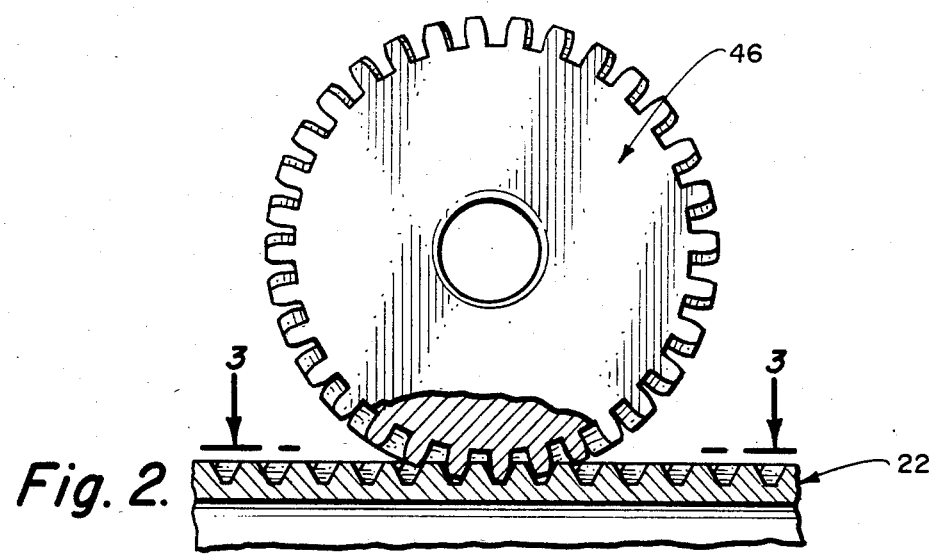
FIG. 2 is a section along line 2—2 in FIG. 1.

In the drawings, 20 (FIGS. 4 and 5) is an elongate, boxlike work piece, in the top surface of which the rack teeth are cut to transform the work piece 20 into a rack 21. In the embodiment shown, the rack teeth are helical; that is, while the teeth 22 are generally transverse to the longitudinal axis of the rack 21, they are skewed slightly by the helix angle H of the teeth (FIG. 1).

Figure 4:
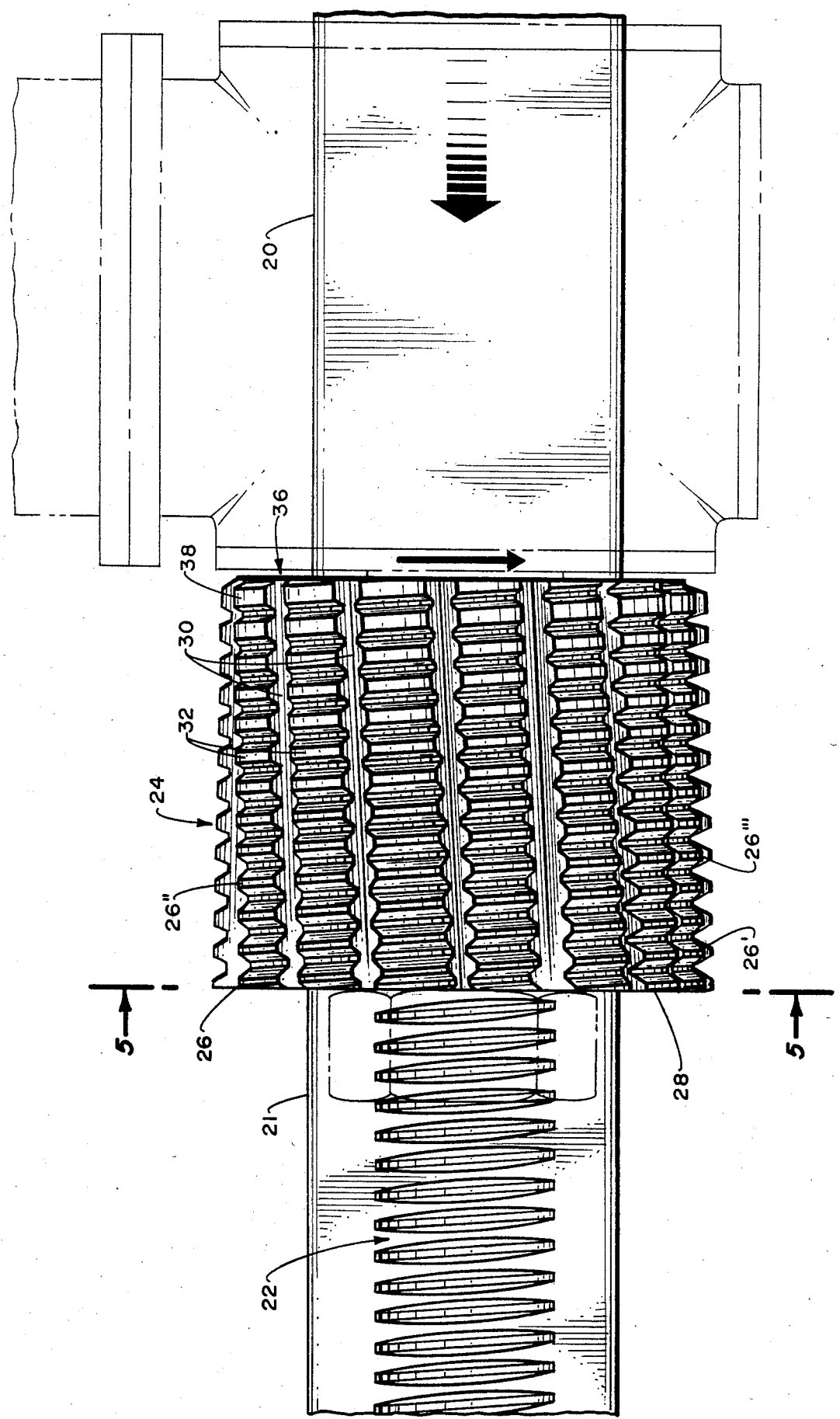
FIG. 4 is a top view showing a conical hob in process of cutting the rack shown in FIG. 1.

The teeth 22 in the rack 21 are made by cutting the top surface of the work piece 20 with a conical hob 24, having at least one helical ridge circumferentially and axially surrounding the conical face of the hob 24. In the particular embodiment shown, the hob 24 has a triple thread in order to attain the desired helix angle in the end product. That is, a given thread or ridge starts at 26 (FIG. 4). One hundred twenty degrees around the circumference of the hob, starts a second thread or ridge 28, and another one hundred twenty degrees aroung starts the third ridge (not shown). The first ridge starts at the large end of the cone at 26, continues to 26', then around the hob to 26", thence to 26''', and so on.

It is to be understood that, if desired, the hob may be made with only a single helix, in which case the helix angle would be smaller. In similar vein, a dual thread or ridge could be employed, in which case, as one moves along the face of the cone longitudinally, there would be a pair of interleaved ridges.

The hob 24 is provided with a plurality of flutes or gashes 30 passing through the helical ridges 26, 28. The flutes are generally parallel to the axis of the hob 24, but are skewed slightly in accordance with conventional practice in order to minimize the shock on the system as the teeth of the hob engage the work piece.

The flutes 30 form cutting teeth 32 around the hob ridges or threads. The leading edge 34 of each tooth 32 constitutes the cutting edges of the hob which engage the work piece 20, to cut the grooves 35 that form the teeth of the rack. As in a conventional hob, the flutes 30 collect the flakes or chips that are cut from the work piece 20.

Figure 6:
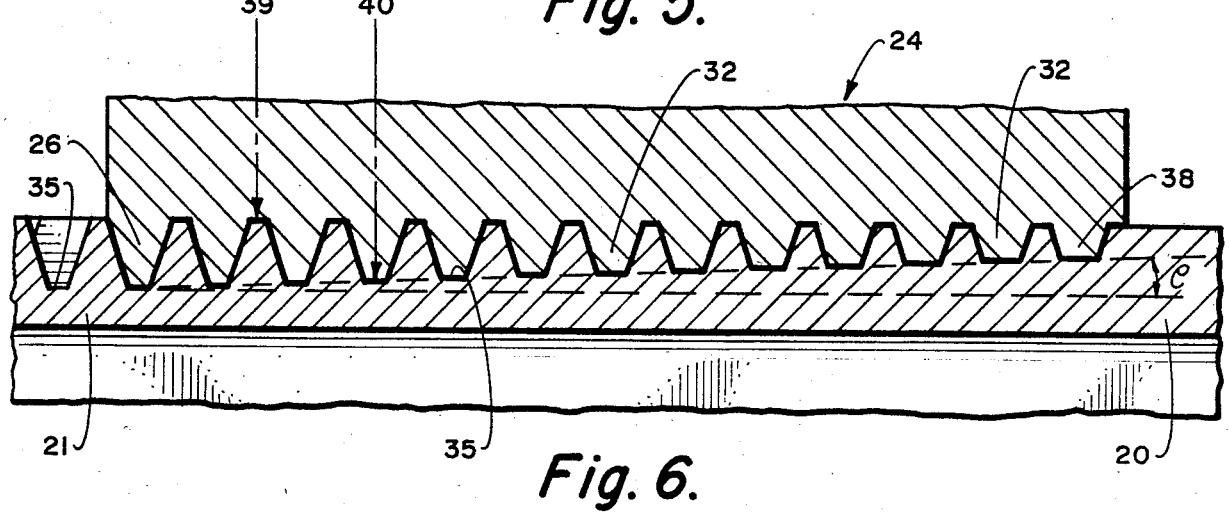
FIG. 6 is a fragmentary section taken along line 6—6 in FIG. 5.

To form the teeth, the hob 24 is rotatably mounted and positioned at one end of the work piece 20. The small end 36 of the cone 24 faces the advancing work piece 20. The work piece 20 is moved longitudinally into engagement with the rotating hob 24, so that the smaller end of the conical hob first engages the surface of the work piece 20, and the teeth 38 at the small end of the hob begin to cut a given groove 35. As the work piece 20 moves longitudinally into further engagement with the hob 24, each successive hob tooth 32, being of increasing radius, cuts deeper into the work piece, until finally, when the end of the hob is reached at 26, the groove 35 has been cut completely into the surface of the work piece and it emerges as the rack shown at 21. As seen in FIG. 6, the root diameter 39 of the hob teeth is constant along the length of the hob 24, but the top diameter 40 steadily increases. Thus the root 39 of the hob thread forming the hob teeth lies on a cylinder centered on the hob axis, while the crest of the thread, forming the top diameter 40, lies on a cone also centered on the hob axis. The top of the tooth narrows to match the narrower width of the rack grooves 35, as the hob cuts deeper into the face of the work piece 20. Advance of the work piece 20 is synchronized with rotation of the hob 24, and at a rate dependent upon hob lead, which in turn is a function of helix angle H.

The envelope of the surfaces indicated at 40 lies on the surface of a cone. As seen in FIGS. 6 and 4, this conic surface has a constant, uniform semivertical angle e, being the angle between the conic elements and the axis of revolution of the cone.

By skewing the axis of the hob 24, with respect to the work piece axis, by the helix angle H, the teeth 22 in the resulting rack 21 will be perpendicular to the axis of the rack.

Figure 3:
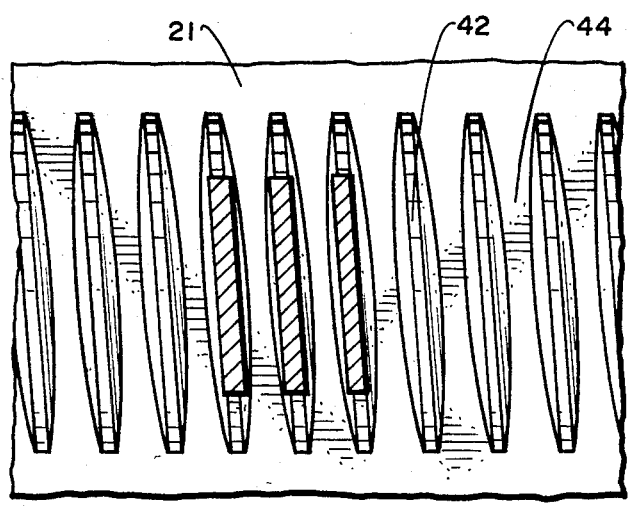
FIG. 3 is a section along line 3—3 in FIG. 2.
Figure 5:
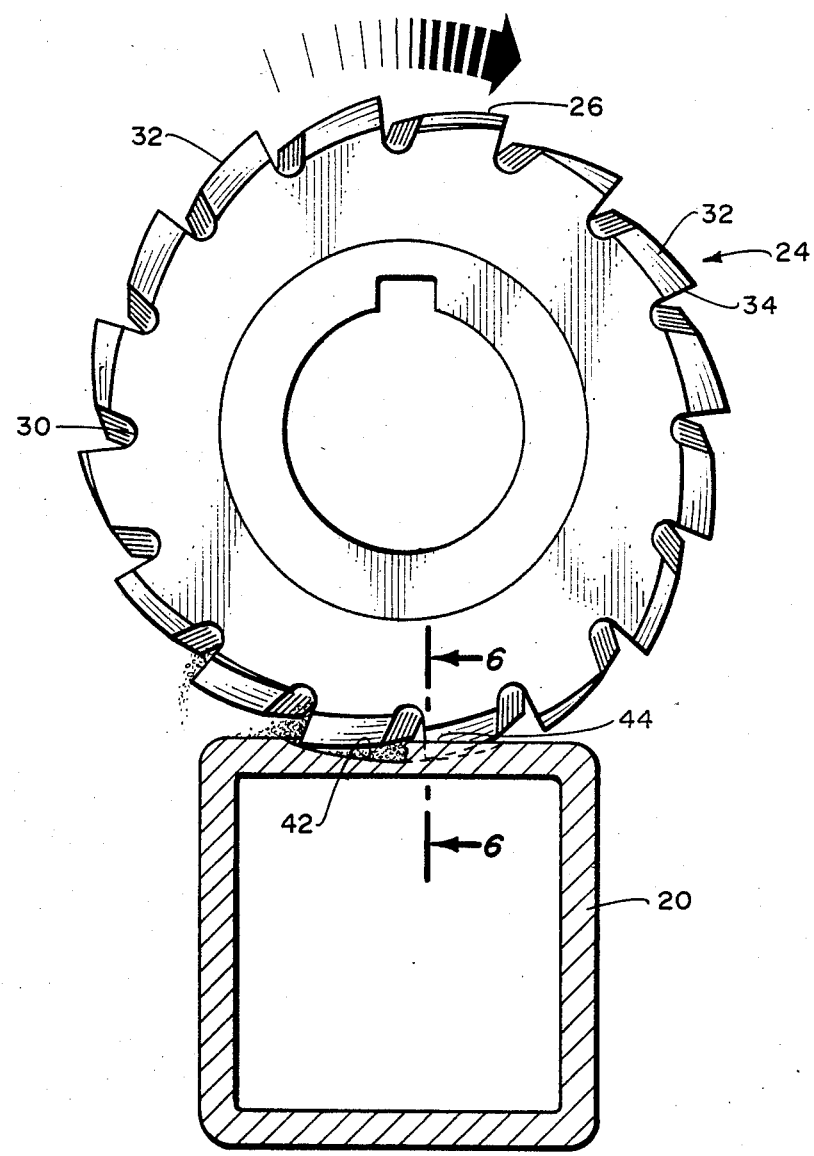
FIG. 5 is a cross section taken on line 5—5 in FIG. 4.

As seen in FIG. 5, each of the resulting rack teeth 22 has a concave, recessed arcuate root 42 and consequently a recessed arcuate pitch line. As seen in FIGS. 1, 3, and 4, the grooves or roots 42 do not extend all the way across the width of the face of the rack 21, but are recessed therein, stopping short of the side edges of the rack. This leaves a smooth track at the margin of the face at each side of the rack 21 on which may ride rollers mounted on the framework in which the pinion gear is journaled. The top 44 of the tooth is, in the present illustration, left flat, i.e. the surface of the boxlike work piece 20 is left undisturbed. If desired, hob 24 could be constructed so that, as the work proceeds, the tops 44 of the teeth in the rack would also be recessed.

Figure 7:
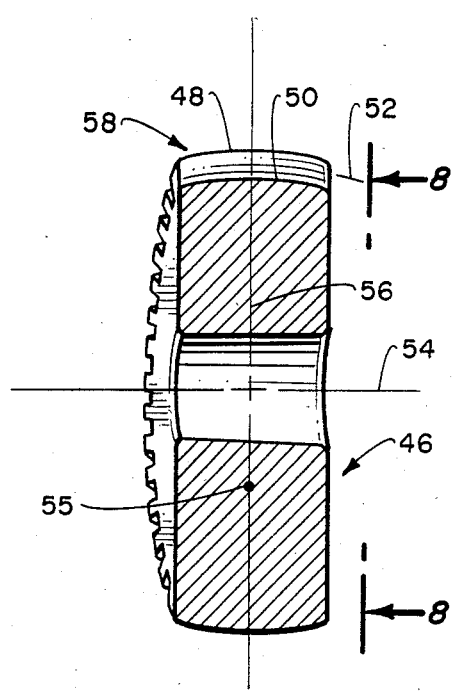
FIG. 7 is a sectional view of the helical gear shown in FIG. 1, taken on line 7—7 in FIG. 1.
Figure 8:
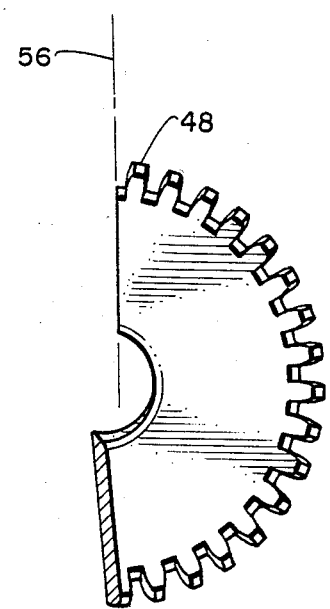
FIG. 8 is a side view taken along line 8—8 in FIG. 7.
Figure 9:
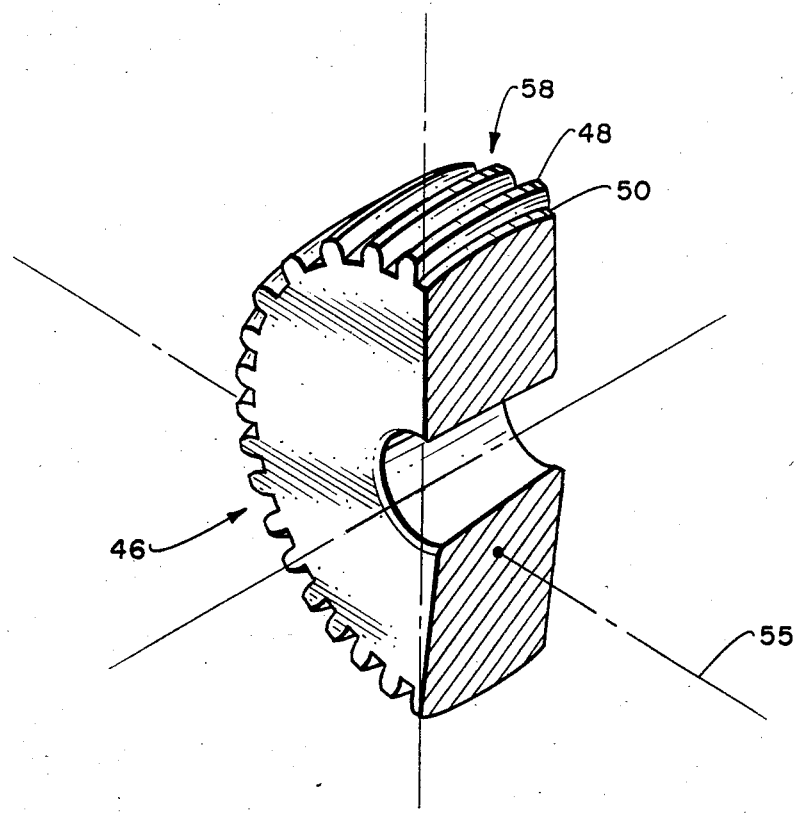
FIG. 9 is a perspective view of the sectioned gear shown in FIGS. 7 and 8.

The rack 21 mates with pinion gear 46, which has arcuate, helical teeth, the helix angle H of the gear 46 being the same as that of the rack 21. As shown in FIG. 7, each tooth of the gear 46 has is arcuate top 48, arcuate root 50, and arcuate pitch line 52 positioned on arcs lying in a plane (the cutting line 7—7 in FIG. 1) which is skewed with respect to the axis 54 of the gear 46 by the helix angle H of the gear. As noted, this is also the helix angle H of the rack 21. The axis 55 about which the respective arcs 48, 50 and 52 are struck intersects a diametral line 56 that bisects the gear tooth 58.

What is claimed is:

1. Process for cutting rack teeth having arcuate roots comprising:
   providing a rotatably mounted, conical hob with a substantially uniform semi vertical angle along its entire length and having teeth formed on a helix;
   providing an elongate work piece generally parallel to the axis of the hob;
   rotating the hob about its axis
   longitudinally moving the hob and work piece relative to each other in synchronism with hob rotation, and at a rate dependent upon hob lead;
   engaging the smaller end of the hob with the work piece;
   continuing the relative longitudinal movement to cause hob teeth of continuously increasing diameter to cut into the work piece, until the hob has passed completely over the work piece;
   thereby forming in the work piece, generally transverse, arcuate, parallel grooves constituting recessed, concave, arcuate roots of rack teeth.

2. Process of claim 1 wherein the rotative axis of the hob is substantially parallel to the axis of the work piece, thereby imparting a helical skew to the rack teeth substantially equal to the helix angle of the hob teeth.

3. Process of claim 1 wherein the rotative axis of the hob is skewed with respect to the axis of the work piece, by substantially the helix angle of the hob, thereby forming rack teeth substantially transverse to the axis of the rack.

4. Process of claim 1 wherein the hob has:
   at least one helical thread of ridge substantially surrounding the conical face of the hob;
   a plurality of flutes or gashes passing through the helical ridge, generally parallel to the hob axis, and forming the cutting teeth of the hob;
   the leading edges of the teeth facing each flute constituting the cutting edges of the hob;
   the flutes constituting chip collection regions where the chips cut from the work piece gather.

5. A conical hob comprising:
   a hob body with a conical face having a substantially uniform semivertical angle along its entire length;
   at least one helical thread or ridge substantially surrounding said face; said thread having its crest lying on said conical face, and having its root lying on a cylinder formed about the hob axis;
   a plurality of flutes or gashes passing through said helical ridge, generally parallel to the hob axis, and forming the cutting teeth of the hob;
   the leading edges of said teeth facing said flutes constituting the cutting edges of the hob;
   said flutes constituting chip collection regions where chips cut from a work piece gather.

* * * * *